G. M. HOAG.
SELF PROPELLED TRUCK.
APPLICATION FILED SEPT. 5, 1913.
1,106,217.
Patented Aug. 4, 1914.
4 SHEETS—SHEET 1.
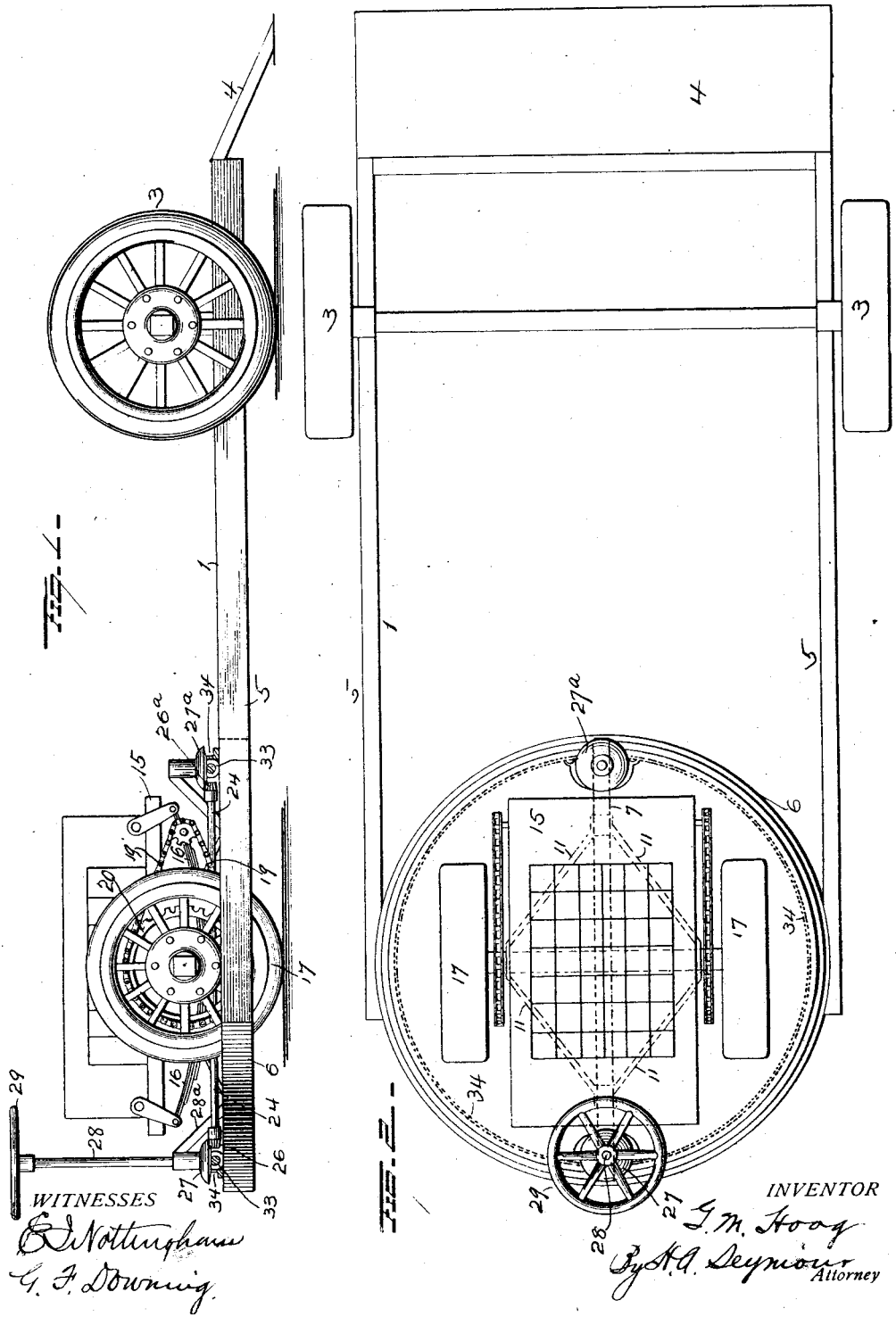
WITNESSES
INVENTOR G. M. HOAG.
SELF PROPELLED TRUCK.
APPLICATION FILED SEPT. 5, 1913.
1,106,217.
Patented Aug. 4, 1914.
4 SHEETS—SHEET 2.
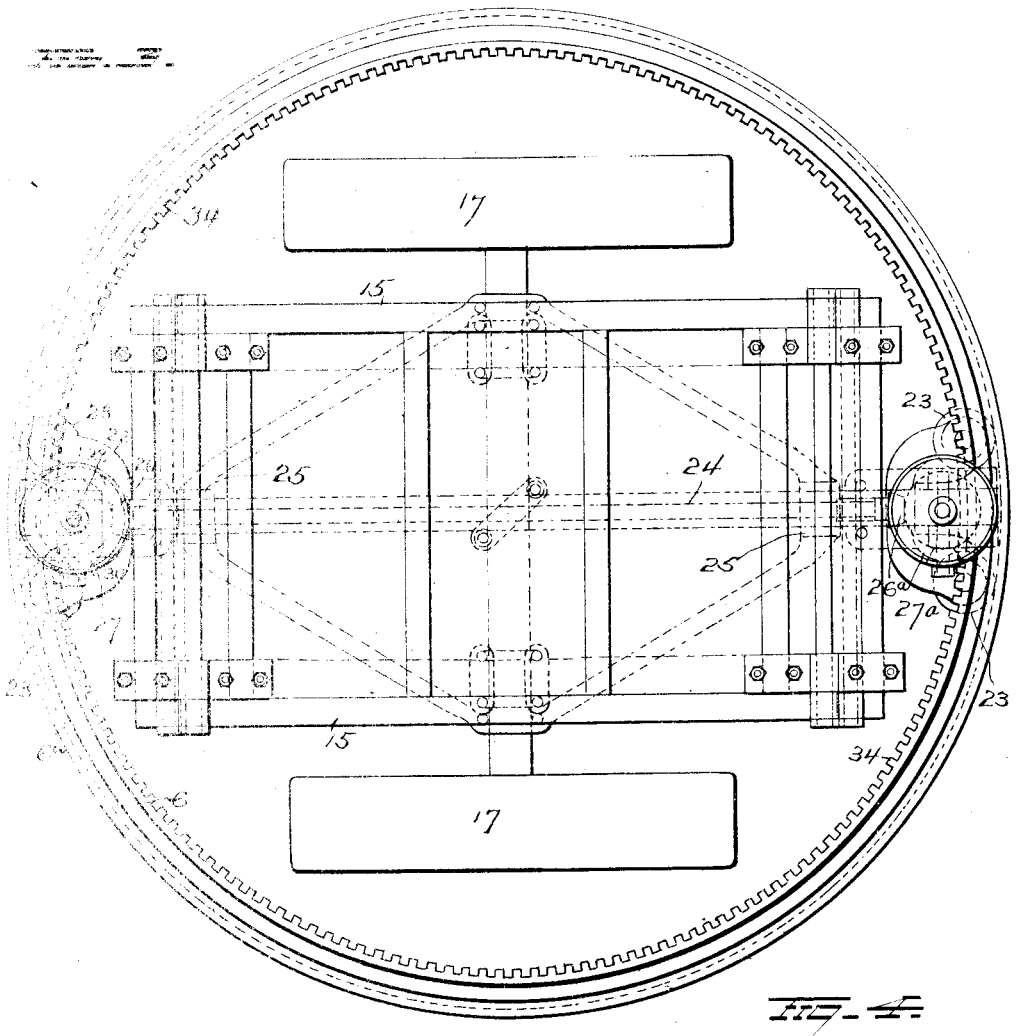
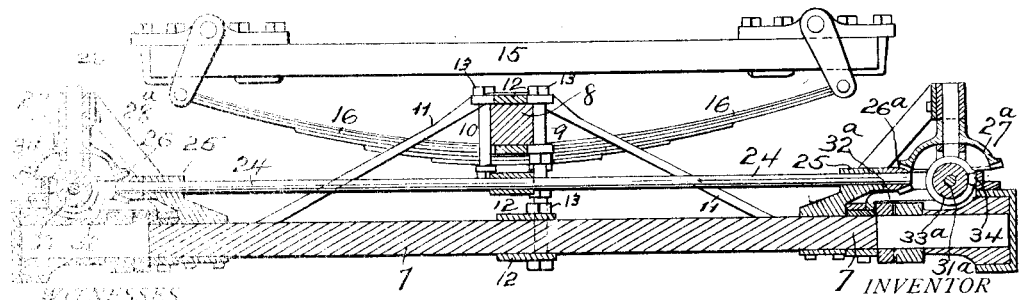

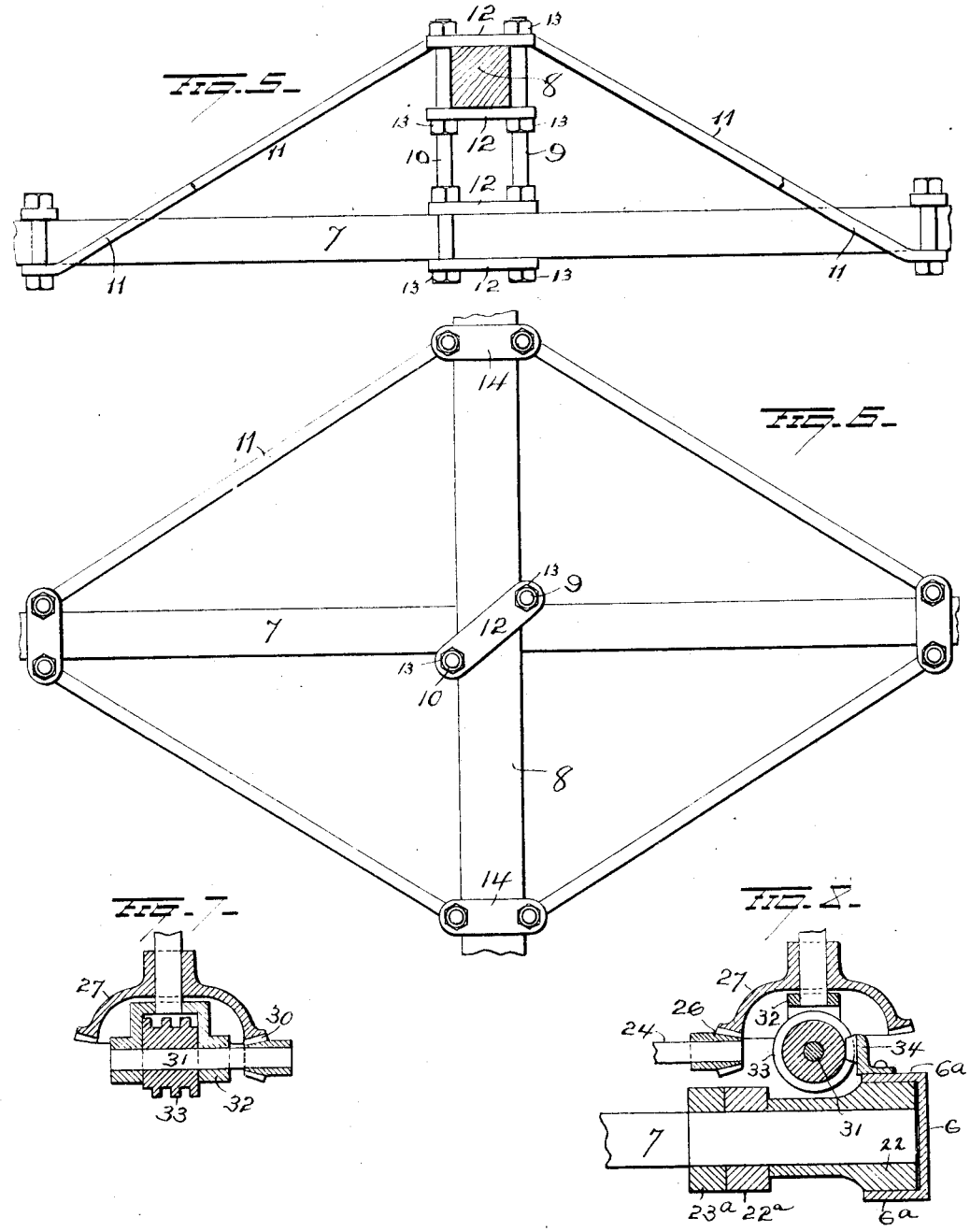

G. M. HOAG.
SELF PROPELLED TRUCK.
APPLICATION FILED SEPT. 5, 1913.
1,106,217.
Patented Aug. 4, 1914.
4 SHEETS—SHEET 4.
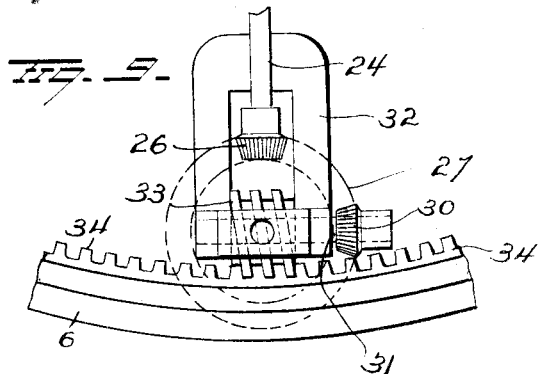
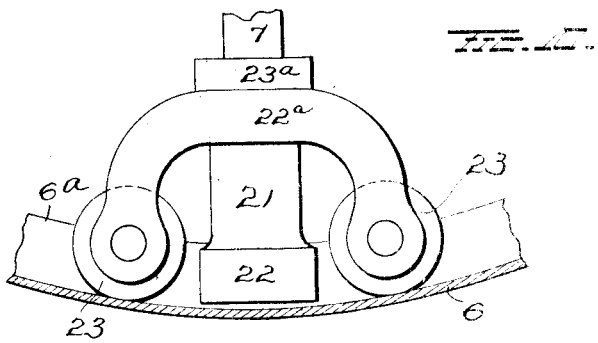
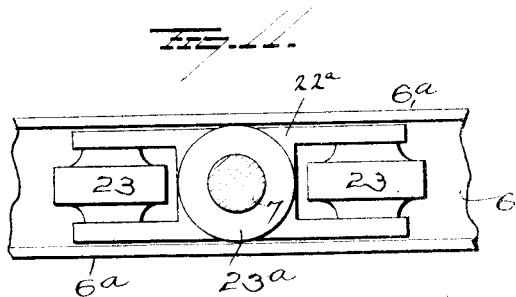
WITNESSES
E. J. Nottingham
G. F. Downing
INVENTOR
G. M. Hoag
By H. A. Seymour
Attorney

UNITED STATES PATENT OFFICE.

GEORGE M. HOAG, OF GALVESTON, TEXAS.

SELF-PROPELLED TRUCK.

1,106,217. Specification of Letters Patent. Patented Aug. 4, 1914.

Application filed September 5, 1913. Serial No. 788,301.

*To all whom it may concern:*

Be it known that I, GEORGE M. HOAG, of Galveston, in the county of Galveston and State of Texas, have invented certain new and useful Improvements in Self-Propelled Trucks; and I do hereby declare the following to be a full, clear, and exact description of the invention, such as will enable others skilled in the art to which it appertains to make and use the same.

My invention relates to an improvement in self propelled trucks, the object being to provide a truck in which the tractor has a free turning movement independently of the truck frame.

A further object is to so connect the tractor and truck by a universal joint connection, that either may give or yield in any direction without transmitting any strains to the other.

A further object is to provide improved means for holding the tractor centrally within the opening in the truck platform.

A further object is to so connect the tractor and truck that the former may be turned to any position independently of the truck without any torsional strain on the tires of the tractor wheels.

A further object is to provide a construction wherein the body of the truck may be low down and straight from end to end, thus simplifying the construction and lessening the cost of manufacture.

With these and other objects in view my invention consists in the parts and combinations of parts as will be more fully explained and pointed out in the claims.

In the accompanying drawings,—Figure 1 is a view in side elevation of my improved truck. Fig. 2 is a view in plan of same. Fig. 3 is an enlarged view in plan of the tractor member, its ring, and the steering mechanism for the former. Fig. 4 is a view in section of the latter. Figs. 5 and 6 are views showing the means for connecting and bracing the axle and truck carrying member of the tractor. Figs. 7, 8 and 9 are views of steering connections between the tractor and truck ring, and Figs. 10 and 11 are views showing the manner of connecting the truck carrying member of the tractor and the truck ring.

1 represents a truck of the low down type, the rear end of the platform of which is carried by the bent axle 2 of the rear wheels 3. This platform is provided at its rear end with a tail gate 4 which when lowered, forms a runway for the loading and unloading trucks. The sides of the body 1 of the truck are preferably formed of channel irons 5, which are rigidly secured at their front ends to the ring 6, which latter, as shown in Fig. 4, is also made of channel iron. The diameter of ring 6 is approximately equal to the width of the truck platform, and is wholly open for the reception of the tractor, which is sustained centrally within the ring 6 by the truck carrying member 7, the ends of which rest within the channel of the ring 6.

Located above the truck carrying member 7 of the tractor, is the axle 8, the latter being at right angles to the member 7, and rigidly secured thereto by the bolts 9 and 10, and by the braces 11. The bolts 9 and 10 are located respectively on opposite sides of the axle and truck supporting member 7, and pass through clips 12 located respectively above and below the axle and above and below the member 7, the parts being secured together and sustained in proper relative positions, by the nuts 13, secured to the threaded bolts 9 and 10 and bearing against the four clips 12 as shown in Fig. 5. The braces 11 are each secured at one end to the axle 8, adjacent the driving sprocket wheels, and at their other ends to the truck supporting member 7 adjacent the ends of the latter, the clamps 14 being employed for connecting the braces to said parts.

15 is the tractor frame mounted on springs 16 secured to the axle 8. This frame 15 carries the storage batteries and motor, which latter drives the tractor wheels 17 through the sprockets 18, chains 19 and sprockets 20, the latter being secured to the tractor wheels.

The truck carrying member 7 of the tractor, is of a length equal to the greatest diameter of the ring 6, and is located centrally within said ring with its ends within the channel of the latter and between the flanges of the ring. It has an easy turning fit within the channel of the ring and is provided at each end with a sleeve 21 which latter has enlarged cylindrical outer ends 22 which have an easy fit between the flanges $6^a$ of the channel ring 6 so as to prevent any dipping or tilting movement of the truck carrying member within the ring 6. The member 7 is also provided at each end with a yoke $22^a$, loosely mounted thereon and carrying the rollers 23 which latter are intermediate the flanges $6^a$ and bear against the ring 6. The sleeves 21 bear at their inner ends against the yokes 22ᵃ and the latter are held in place by the nuts 25ᵇ secured to the member 7. With this construction the cylindrical ends 22 of the sleeves 21 carry and support the front end of the truck, while the rollers 23 take the end thrust and transmit all necessary movements of the tractor to the truck frame.

In the construction shown, the carrying member 7 is in the horizontal plane of the truck platform, and with the ring 6, and as the axle is above and at right angles to the truck carrying member 7, it will be seen that the ring 6 at the front end of the truck is carried in a plane below the hubs of the wheels. It will also be seen that by thus mounting the front end of the truck on the tractor member, a universal or gimbal joint connection is provided which permits the truck or the tractor to move or give in any direction without affecting the position of the other and without transmitting any strains to the other.

Located parallel to the frame carrying member 7, and mounted in bearings 25 carried by the same, is the steering shaft 24, provided at its forward end with the bevel pinion 26 and at its rear end with the bevel pinion 28ᵃ. The pinion 26 at the front end of shaft 24, meshes with the crown gear 27 fixed to the lower end of steering shaft 28, the latter being mounted in bracket 28ᵃ and provided at its upper end with a steering wheel 29, and the crown gear 27, also meshes with pinion 30 on shaft 31, which is mounted in a bracket 32 rigidly secured to the truck carrying member 7. Secured to this shaft 31 intermediate the shaft carrying members of the bracket, is the worm 33 which meshes with the rack 34 secured to the upper side of the top flange 6ᵃ of the channel ring 6. It will therefore be seen that by turning steering shaft 28, worm 33 will be rotated and by its engagement with the rack 34 will turn the tractor member within the ring.

As before explained, shaft 24, extends lengthwise the truck carrying member 7 and is provided at its rear end with a pinion 28ᵃ. This pinion meshes with the crown gear 27ᵃ which latter is also in mesh with pinion 30ᵃ on shaft 31ᵃ, which is mounted in a yoke 32ᵃ rigidly fixed to the carrying member 7, and the shaft 31ᵃ carries a worm 33ᵃ which also meshes with the rack 34. By this construction the carrying member 7 is connected by worms with the ring 6 at diametrically opposite points, so that at all times and under all conditions, the carrying member 7 is maintained centrally within the ring, and as the tractor is rigid with the carrying member, it follows that the tractor will be held at all times in the center of the frame. By this construction the tractor may be turned to any position within the ring, without disturbing the position of the truck, hence it can be turned to its necessary position before any power is applied to the tractor wheels for propelling the truck and by the employment of steering means at diametrically opposite points on the tractor frame, the latter will be always maintained centrally within the truck ring.

By providing the tractor with oppositely disposed steering means, whereby the steering power is applied at oppositely disposed points, I dispense with the necessity of fifth wheel, king pin, or other devices heretofore employed for holding the tractor centrally disposed with relation to the truck frame.

While I have shown my improvements applied to a low down truck, it is clearly evident that by changing the relative position of the axle 3 and carrying member 7, the truck platform can be located at any height desired. It is also evident that numerous other changes in the construction might be resorted to without departing from the spirit and scope of my invention, hence I would have it understood that I do not confine myself to the details disclosed but consider myself at liberty to make such departure therefrom as may fall within the spirit and scope of my invention.

Having fully described my invention what I claim as new and desire to secure by Letters Patent, is:

1. In a self propelled vehicle, the combination of a vehicle body having a ring at its forward end, a tractor embraced by the ring, means connecting the tractor and ring whereby the front end of the vehicle body is supported by the tractor, and steering means carried by the tractor and engaging the ring at two points whereby the tractor is maintained centrally within the ring.

2. In a self propelled vehicle, the combination of a vehicle body having a ring at its forward end, a tractor embraced by the ring, means connecting the tractor and ring whereby the front end of the vehicle body is supported by the tractor, and steering means carried by the tractor and engaging the ring at diametrically opposite points whereby the tractor is maintained centrally within the ring.

3. In a self propelled vehicle, the combination of a vehicle body having a ring at its front end, a tractor embraced by the ring, means connecting the tractor and ring whereby the front end of the vehicle body is supported by the tractor, a steering shaft carried by the tractor, and gearing at both ends of said shaft engaging the ring, the said gearing being actuated by the shaft.

4. In a self propelled vehicle, the combination of a vehicle body having a ring at its front end, a rack on said ring, a tractor within the ring, a shaft carried by said tractor, a gear wheel at each end of the shaft, gearing actuated by said gear wheels and meshing with the rack, and means for actuating the shaft.

5. In a self propelled vehicle, the combination of a vehicle body having a ring at its front end, a rack carried by said ring, a tractor within the ring, a shaft carried by said tractor and extending centrally across the ring, gearing carried by the tractor and meshing with the rack, a toothed wheel on each end of said shaft for actuating said gearing, and means for actuating said shaft.

6. In a self propelled vehicle, the combination of a vehicle body having a ring rigidly secured at the front end of said body, a tractor within the ring, the said tractor having a truck carrying member located centrally within the ring and loosely connected at its ends with the latter whereby the tractor and its truck carrying member may turn horizontally, and steering means for turning the tractor.

7. In a self propelled vehicle, the combination of a vehicle body having a ring and a circular rack at its front end, a tractor within the ring the said tractor having a truck carrying member located centrally with relation to the ring and engaging the latter at diametrically opposite points, and steering mechanism also carried by the tractor and engaging the rack at two points whereby the tractor is maintained centrally within the ring and has free turning movement in the same.

8. In a self propelled vehicle, the combination with a vehicle body having a ring at its forward end, a rack carried by said ring, a tractor within the ring, the said tractor having a truck carrying member located centrally with relation to the ring and engaging the latter at two oppositely disposed points, and steering gearing located adjacent each end of said truck carrying member and engaging the rack on the ring whereby when the steering gearing is actuated the truck carrying member of the tractor will turn horizontally in the ring.

9. In a self propelled vehicle, the combination of a vehicle body having a ring at its forward end, a tractor within the ring, the said tractor having a truck carrying member located centrally with relation to the ring and engaging the latter at both ends, steering means for moving the truck carrying member horizontally within the ring, and an axle at right angles to said member, the said axle and member being rigidly connected.

10. In a self propelled vehicle, the combination of a vehicle body having a channeled ring at its forward end, a tractor within the ring, the said tractor having a truck carrying member centrally located with relation to the ring, and loose sleeves on the ends of said carrying member and resting and moving within the channel in the ring.

11. In a self propelled vehicle, the combination of a vehicle body having a channeled ring at its forward end, a tractor within the ring, the said tractor having a truck carrying member and an axle at right angles to said member, and sleeves mounted on the ends of said member and resting and moving within the channel of the ring.

12. In a self propelled vehicle, the combination of a vehicle body having a channeled ring at its forward end, a tractor within the ring, the said tractor having a truck carrying member and an axle at right angles to said member, a loose sleeve, and thrust rollers at each end of said member, the said sleeves and rollers resting and moving within the channel of the ring.

13. In a self propelled vehicle, the combination of a body having a ring at its forward end and a tractor having a truck carrying member located at right angles to the axle of the tractor, the said truck carrying member having loose connection at both of its ends with the ring whereby it may have a free horizontal turning movement in the ring.

14. In a self propelled vehicle, the combination of a body having a ring at its forward end, a tractor having its truck carrying member at right angles to its axle, the said truck carrying member having loose connection at both of its ends with said ring whereby it has a free horizontal turning movement within the ring, and steering means adjacent each end of the truck carrying member.

In testimony whereof, I have signed this specification in the presence of two subscribing witnesses.

GEORGE M. HOAG.

Witnesses:
 GEORGE F. DOWNING,
 S. G. NOTTINGHAM.